US012653157B1

(12) United States Patent
Morrison

(10) Patent No.: US 12,653,157 B1
(45) Date of Patent: Jun. 16, 2026

(54) EQUINE FORAGING TOY

(71) Applicant: Marlow Ann Morrison, Santa Fe, NM (US)

(72) Inventor: Marlow Ann Morrison, Santa Fe, NM (US)

( * ) Notice: Subject to any disclaimer, the term of this patent is extended or adjusted under 35 U.S.C. 154(b) by 0 days.

(21) Appl. No.: 18/762,432

(22) Filed: Jul. 2, 2024

Related U.S. Application Data

(60) Provisional application No. 63/528,116, filed on Jul. 21, 2023.

(51) Int. Cl.
A01K 15/02 (2006.01)
A01K 5/01 (2006.01)

(52) U.S. Cl.
CPC .......... A01K 15/026 (2013.01); A01K 5/0114 (2013.01)

(58) Field of Classification Search
CPC ... A01K 15/025; A01K 15/026; A01K 5/0114
See application file for complete search history.

(56) References Cited

U.S. PATENT DOCUMENTS

| | | | |
|---|---|---|---|
| 7,306,838 B2 | 12/2007 | Prévost | |
| D769,546 S * | 10/2016 | Hansen | D30/121 |
| 9,596,830 B2 | 3/2017 | Yannello et al. | |
| D833,086 S * | 11/2018 | Hansen | D30/121 |
| 10,808,366 B2 | 10/2020 | Tetrault et al. | |
| 2006/0201445 A1 | 9/2006 | Stonier | |

| | | | |
|---|---|---|---|
| 2014/0060442 A1 * | 3/2014 | Ressemann | A61D 5/00 |
| | | | 119/61.5 |
| 2015/0068461 A1 * | 3/2015 | Lindskov | A01K 5/0135 |
| | | | 119/51.01 |
| 2015/0334993 A1 * | 11/2015 | Roetheli | A61D 5/00 |
| | | | 426/512 |
| 2017/0231191 A1 * | 8/2017 | Yang | A01K 29/00 |
| | | | 119/61.5 |
| 2018/0027773 A1 * | 2/2018 | O'Donnell | A01K 15/025 |
| 2022/0330521 A1 * | 10/2022 | Stone | A01K 15/025 |
| 2023/0292701 A1 * | 9/2023 | Shaw | A01K 5/0114 |
| | | | 119/61.56 |

FOREIGN PATENT DOCUMENTS

| | | | |
|---|---|---|---|
| KR | 20040084449 A | | 10/2004 |
| KR | 20180007847 | * | 1/2018 |
| PL | 17840 S2 | | 4/2012 |

* cited by examiner

*Primary Examiner* — Trinh T Nguyen
(74) *Attorney, Agent, or Firm* — John Rizvi; John Rizvi, P.A.—The Patent Professor®

(57) ABSTRACT

The present invention relates to an equine foraging toy designed to promote natural grazing behavior and provide mental and physical stimulation for horses. The inventive toy comprises a base configured to be placed in a feed pan or similar container, and a plurality of protrusions made of a durable, felt-like material, designed to mimic grass that a horse would graze. The equine foraging toy encourages the horse to engage in foraging behaviors while consuming its regular feed or hay, contributing to improved welfare and well-being. Specifically designed to accommodate the size, feeding habits, and dietary requirements of horses, the inventive toy offers various features for ease of use, cleaning, and maintenance, making it a valuable addition to the range of available horse toys and enrichment tools.

18 Claims, 5 Drawing Sheets

EQUINE FORAGING TOY

CROSS-REFERENCE TO RELATED APPLICATIONS

This application claims the benefit of U.S. Provisional Patent Application No. 63/528,116 filed on Jul. 21, 2023, which is incorporated by reference herein in its entirety.

FIELD OF THE INVENTION

The present invention relates generally to the field of animal toys. More particularly, the present invention relates to a horse toy designed to mimic the natural grazing behavior of horses, providing both mental and physical stimulation.

BACKGROUND OF THE INVENTION

Horses, as natural grazing animals, spend a significant portion of their day foraging for food. In the wild, horses spend up to 16 hours a day grazing on various types of vegetation, primarily grasses. This grazing behavior not only satisfies their nutritional needs but also provides them with mental and physical stimulation, as well as social interaction. In domestic environments, however, horses are often confined to stalls or small paddocks, which can limit their ability to engage in natural grazing behaviors. Providing opportunities for horses to express their innate foraging behaviors is crucial for their overall health and well-being. Inadequate stimulation can lead to boredom, stress, and the development of unwanted behaviors, such as cribbing or weaving.

Various toys and devices have been developed to provide mental stimulation and enrichment for animals, including those for horses. These devices can be broadly categorized into three main groups: treat-dispensing toys, physically interactive toys, and sensory stimulation toys.

Treat-dispensing toys are designed to hold and gradually release food items, encouraging the animal to interact with the toy to obtain the treats. Examples of treat-dispensing toys for horses include treat balls, which release treats when rolled or manipulated, and hay nets or slow feeders, which allow the horse to access hay or forage at a slower rate, prolonging feeding time and reducing the risk of overeating. While treat-dispensing toys can provide some level of mental stimulation, they often do not closely replicate the natural grazing experience and may not address the specific needs of horses.

Physically interactive toys are designed to encourage the animal to manipulate the toy using their body, often incorporating elements of play, curiosity, or problem-solving. Examples of physically interactive toys for horses include puzzle feeders, which require the horse to move or manipulate parts of the toy to access food, and hanging toys, such as large balls or rope-based toys, which the horse can push, pull, or otherwise interact with. These toys can provide physical exercise and mental stimulation but generally do not focus on replicating the natural grazing experience. Additionally, these toys may not be suitable for all horses, particularly those with limited mobility or other physical limitations.

Sensory stimulation toys focus on engaging the animal's senses, such as touch, smell, or taste, and can provide a calming or engaging effect. Examples of sensory stimulation toys for horses include lick mats, which encourage the horse to lick or nibble on the toy to access a spreadable treat, and scented or flavored toys, which can be hung in the stall or paddock for the horse to explore with their nose or mouth. While these toys can provide sensory stimulation and enrichment, they often do not replicate the natural grazing experience and may not be sufficient for horses requiring more substantial mental and physical stimulation.

In recent years, snuffle toys for dogs have gained popularity as a means of providing mental stimulation and enrichment. These toys consist of a fabric or textile base, covered with multiple layers of fabric strips or protrusions, wherein treats or kibble can be hidden. The dog must then use its sense of smell and foraging skills to locate the food, mimicking the process of searching for food in a natural environment. Snuffle toys have been shown to provide both mental and physical benefits for dogs, helping to reduce boredom, anxiety, and destructive behaviors.

However, snuffle toys designed for dogs are not suitable for horses due to several factors. First, the size of the toys is generally too small for horses, and they may pose a choking hazard or be easily damaged by the larger and stronger animals. Second, the materials used in dog snuffle toys may not be durable enough to withstand the wear and tear caused by horses, who have stronger jaws and teeth. Third, the design of the snuffle toys may not adequately address the unique feeding habits and dietary requirements of horses, who primarily consume fibrous forage, such as grass or hay, rather than the small, discrete kibble or treats used in dog snuffle toys.

Furthermore, many existing horse toys are not designed for easy integration into the horse's daily routine, and may require additional setup, cleanup, or monitoring to ensure safe and effective use. For example, treat-dispensing toys may require frequent refilling and cleaning to prevent the growth of mold or bacteria, while physically interactive toys may need to be monitored for signs of wear or damage that could pose a safety risk to the horse.

Accordingly, remains a need for an equine-specific toy that allows horses to engage in natural grazing behaviors, providing mental and physical stimulation, while being suitable for use in a variety of environments and conditions. Ideally, such a toy would be designed to accommodate the size, feeding habits, and dietary requirements of horses, while also being durable, easy to clean, and low-maintenance.

SUMMARY OF THE INVENTION

The present invention relates to an equine foraging toy designed to promote natural grazing behavior in horses, providing both mental and physical stimulation. The toy comprises a base configured to be placed in a feed pan or similar container and a plurality of protrusions made of a durable, felt-like material, designed to mimic grass that a horse would graze. The inventive toy allows the horse to engage in foraging behaviors while consuming its regular feed or hay, promoting overall health and well-being. The equine foraging toy is specifically designed to accommodate the size, feeding habits, and dietary requirements of horses and offers various features for ease of use, cleaning, and maintenance.

The present invention offers several benefits over the prior art, providing a unique solution for equine enrichment that closely replicates the natural grazing experience for horses. Unlike many existing horse toys, the equine foraging toy of the present invention is designed to accommodate the specific needs of horses, including their size, feeding habits, and dietary requirements. The use of a durable, felt-like material for the protrusions ensures longevity and easy cleaning, while the design allows for integration into the horse's daily routine with minimal effort from the caretaker. By addressing the limitations of existing horse toys, the equine foraging toy of the present invention contributes to improved welfare and well-being for horses, promoting natural grazing behaviors and providing mental and physical stimulation. Additionally, toys designed for dogs in pet environments are not suitable for horses in a livestock environment. Fabrics and materials found in the present invention are UV resistant and are consistent with those materials found in livestock settings, equestrian facilities, zoos, and veterinarian enclosures.

In a first implementation of the invention, an equine foraging toy for promoting natural grazing behaviors in horses comprises:

a base configured to be placed in a feed pan or similar container; and a plurality of protrusions attached to the base, wherein the protrusions are made of a durable, felt-like material and are designed to mimic grass that a horse would graze, thereby facilitating foraging behaviors in the horse while consuming its regular feed or hay; wherein the equine foraging toy provides both mental and physical stimulation for horses, promoting their overall health and well-being, and is specifically designed to accommodate the size, feeding habits, and dietary requirements of horses.

In a second aspect, the base may be made of a durable, waterproof material suitable for use in various environments and conditions.

In another aspect, the plurality of protrusions may be arranged in a pattern or density that promotes varying levels of difficulty in foraging, thereby encouraging the horse to engage in different foraging strategies.

In another aspect, the equine foraging toy may further comprise a drawstring attached to the base for easy removal of the toy from the feed pan or similar container.

In another aspect, the base may be configured to fit within the divot of a feeding pan, allowing for the placement of hay pellets or other feed items in the same pan.

In another aspect, the felt-like material of the protrusions may be selected from a group consisting of polyester, acrylic, wool, or a blend thereof.

In another aspect, the base may shaped as a circle, oval, square, rectangle, or any other suitable shape to accommodate various feed pan sizes and shapes.

In another aspect, the protrusions may have varying lengths and/or thicknesses to create a more realistic grass-like texture and challenge.

In another aspect, the toy may adaptable to accommodate various types of horse feed, including but not limited to hay, hay pellets, or other suitable forage materials.

In another aspect, the base and/or protrusions are made of materials that are easy to clean and maintain, allowing for regular use without significant wear or degradation.

In another aspect, wherein the base includes a non-slip material or feature to prevent the toy from moving excessively within the feed pan or similar container during use.

In another aspect, the protrusions may be attached to the base using a secure method, such as stitching, adhesive, or heat bonding, to ensure durability and longevity.

In another aspect, the base may comprise one or more reinforced areas to provide additional structural support and prevent damage from the horse's teeth or hooves during use.

In another aspect, the felt-like material of the protrusions may be treated with an antimicrobial agent or coating to inhibit the growth of mold, mildew, or bacteria.

In another aspect, the toy may include one or more attachment points, loops, or straps for securing the toy to the feed pan or similar container, or for hanging the toy in the horse's stall or paddock.

In another aspect, the base and/or protrusions are available in various colors, patterns, or designs to provide visual stimulation and interest for the horse.

In another aspect, the base may include one or more pockets or compartments for hiding treats, supplements, or other incentives to further encourage foraging behavior.

In another aspect, the protrusions may be designed to be easily replaced or repaired in case of wear or damage, allowing for the continued use of the toy.

In another aspect, the toy may be designed to be compatible with various types of feed pans, including those with or without divots, as well as other containers or surfaces suitable for feeding horses.

In another aspect, the toy may be designed to be easily and safely used by horses of various sizes, breeds, ages, and physical abilities, without causing harm or undue stress to the animal.

A method for promoting natural grazing behavior and providing mental and physical stimulation for a horse, the method comprises the steps of:

providing an equine foraging toy having a base configured to be placed in a feed pan or similar container and a plurality of protrusions attached to the base, wherein the protrusions are made of a durable, felt-like material and are designed to mimic grass that a horse would graze, thereby facilitating foraging behaviors in the horse while consuming its regular feed or hay;

placing the equine foraging toy in a feed pan or similar container, with the base configured to fit within the divot of the feeding pan or on a flat surface, as appropriate;

optionally, adding hay pellets, hay, or other suitable forage materials to the feed pan or container, either in combination with the equine foraging toy or separately;

allowing the horse to interact with the equine foraging toy, wherein the horse engages in foraging behaviors by consuming its regular feed or hay through the plurality of protrusions made of a durable, felt-like material, designed to mimic grass that a horse would graze; and periodically removing, cleaning, and maintaining the equine foraging toy, as needed, to ensure its continued safe and effective use; wherein the method promotes the overall health and well-being of the horse by providing mental and physical stimulation and encouraging natural grazing behaviors.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
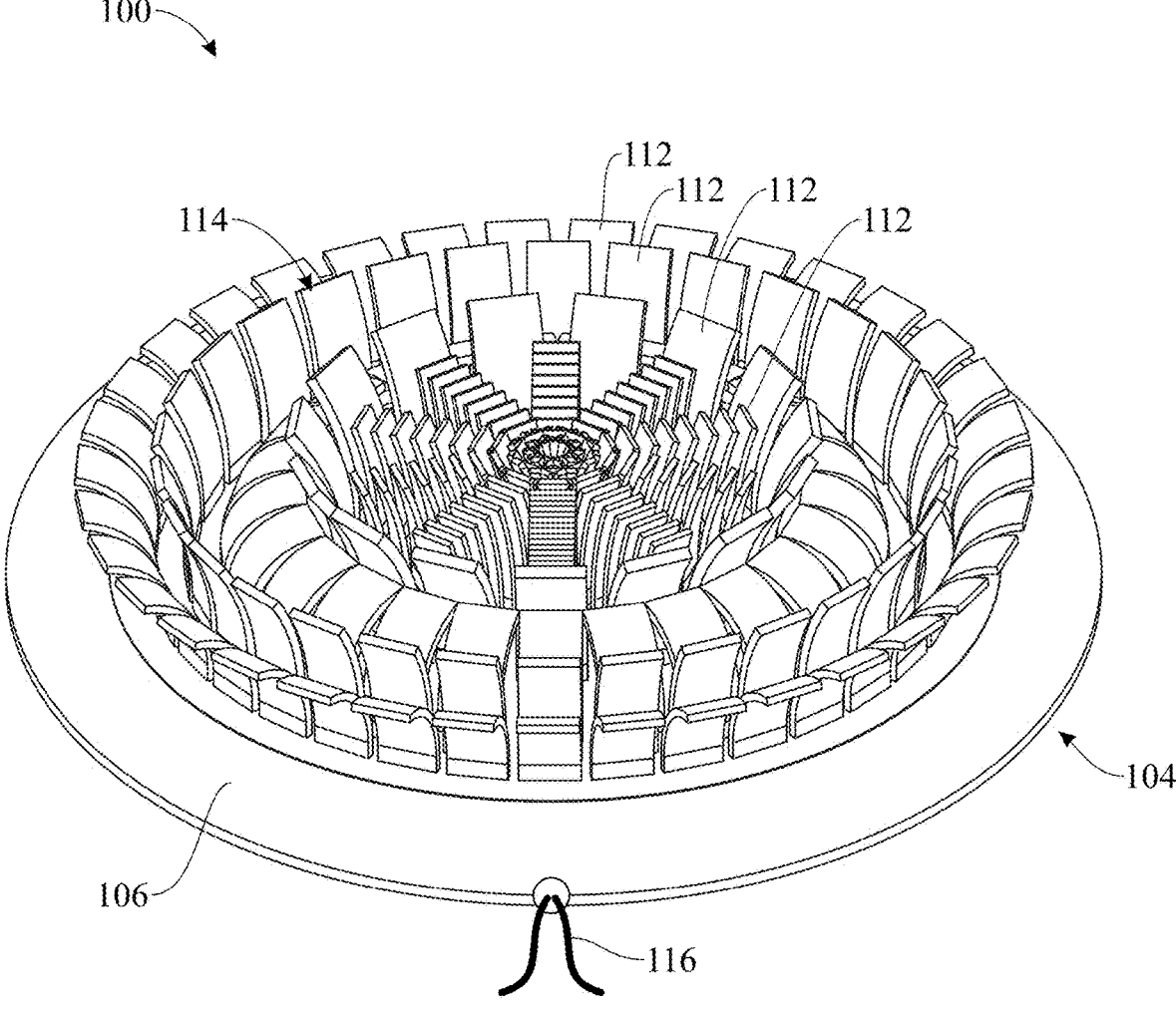
FIG. 1 presents a front perspective view of an equine foraging toy, in accordance with a first illustrative embodiment of the invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an equine foraging toy 100 designed to promote natural grazing behavior in horses, providing both mental and physical stimulation. The toy 100 comprises a base 104 configured to be placed in a feed pan or similar container 108, and a plurality of protrusions 112 made of a durable, felt-like material, designed to mimic grass that a horse would graze. The inventive toy allows the horse to engage in foraging behaviors while consuming its regular feed or hay, promoting overall health and well-being. The equine foraging toy 100 is specifically designed to accommodate the size, feeding habits, and dietary requirements of horses, and offers various features for ease of use, cleaning, and maintenance.

The base 104 of the equine foraging toy can be made from a variety of durable, waterproof materials suitable for use in various environments and conditions. Suitable materials for the base 104 include, but are not limited to, heavy-duty fabric, rubber, silicone, plastic, or a combination of these materials. The base 104 can be shaped as a circle, oval, square, rectangle, or any other suitable shape to accommodate various feed pan sizes and shapes. Additionally, the base 104 may include a non-slip material or feature, such as a textured surface or rubberized backing, to prevent the toy from moving excessively within the feed pan or similar container 108 during use.

The base 104 may also include one or more reinforced areas 106 to provide additional structural support and prevent damage from the horse's teeth or hooves during use. These reinforced areas 106 can be made from a thicker or more durable material, or can be created by doubling or tripling the layers of the base material in specific areas. Furthermore, the base 104 may include one or more attachment points, loops, or straps for securing the toy to the feed pan or similar container, or for hanging the toy in the horse's stall or paddock. These attachment points can be made from durable materials, such as nylon webbing or metal hardware, and can be designed for easy attachment and removal as needed.

Figure 2:
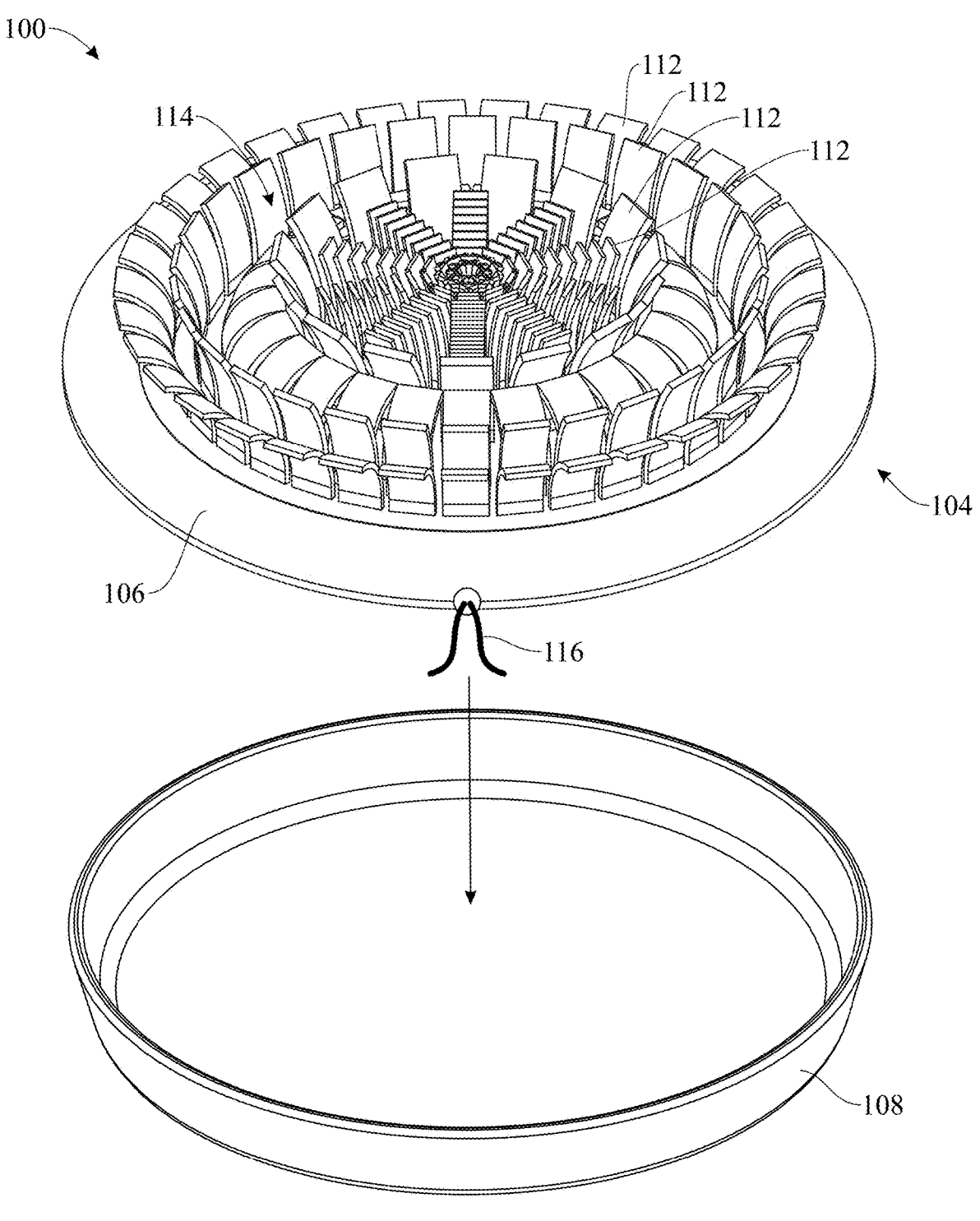
FIG. 2 presents a front perspective view of the equine foraging toy illustrated in FIG. 1, shown being placed into a feed pan.
Figure 3:
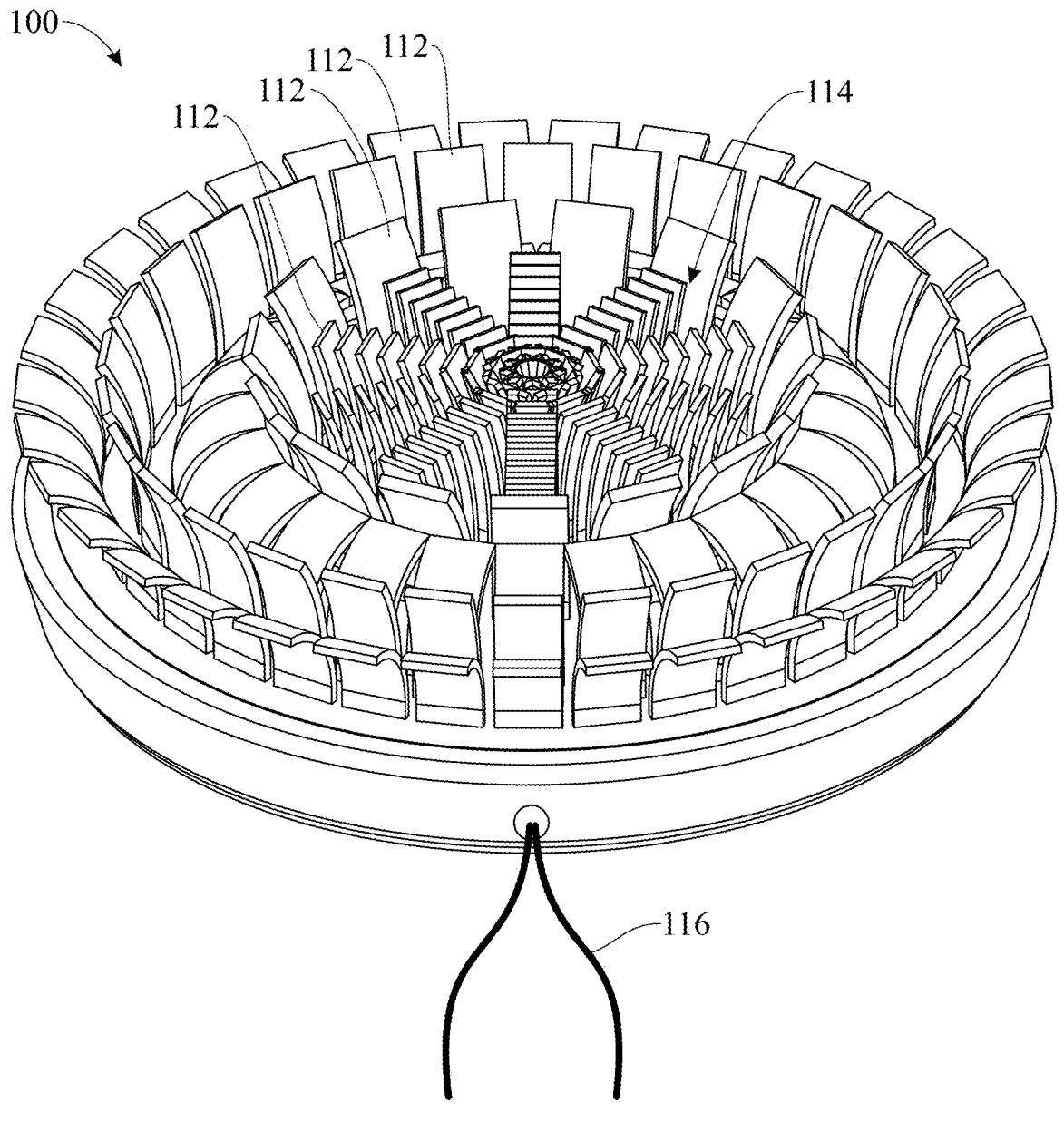
FIG. 3 presents a front perspective view of the equine foraging toy illustrated in FIG. 2, shown placed into a feed pan.
Figure 4:
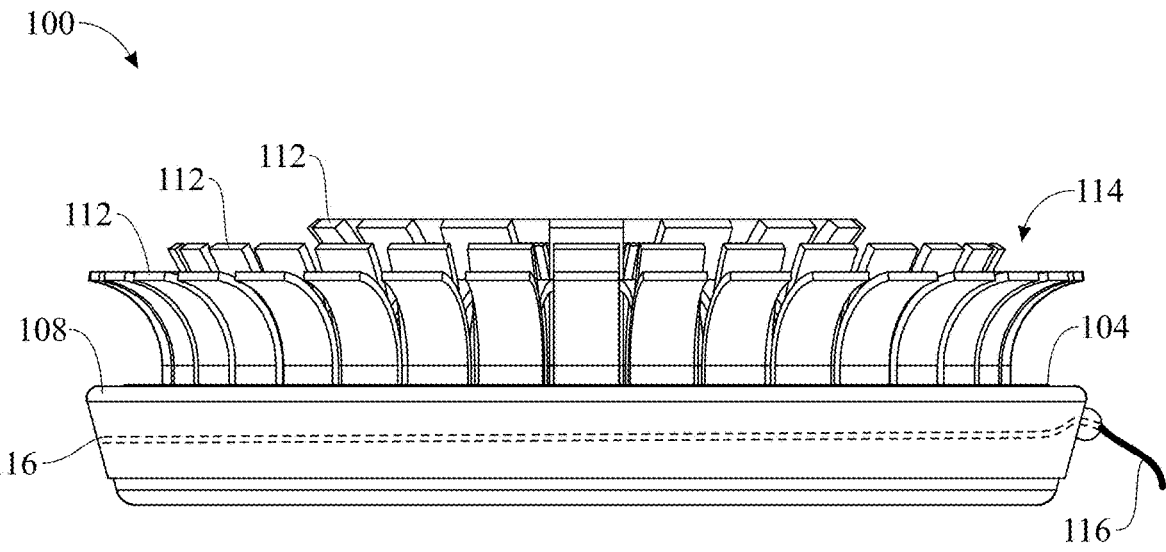
FIG. 4 presents a front cross-sectional view of the equine foraging toy illustrated in FIG. 1.
Figure 5:
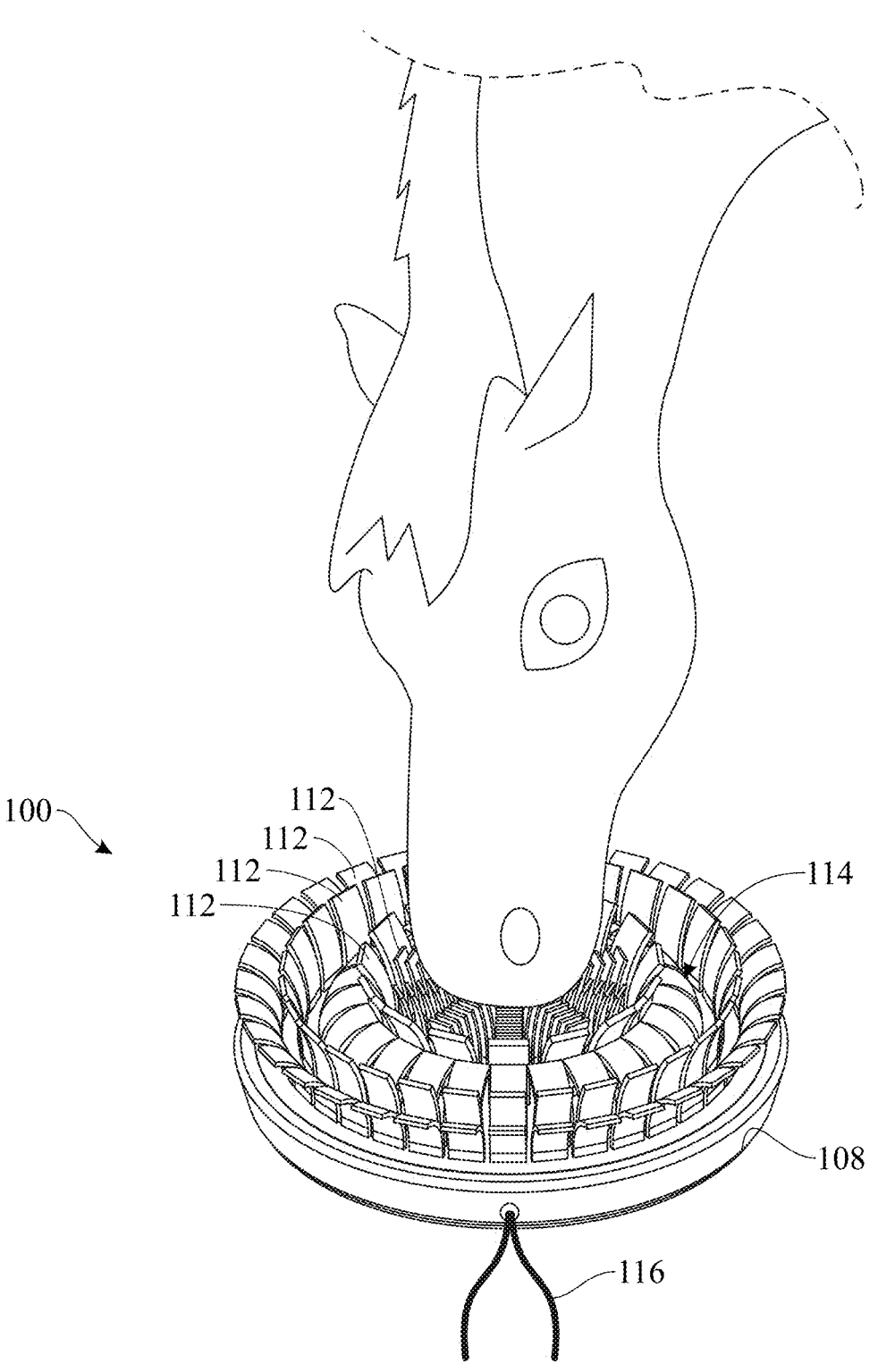
FIG. 5 presents a front perspective view of the equine foraging toy illustrated in FIG. 1, shown being placed into a feed pan.

The plurality of protrusions 112 attached to the base are made of a durable, felt-like material designed to mimic grass that a horse would graze. Suitable materials for the protrusions include, but are not limited to, polyester, acrylic, wool, or a blend thereof. The plurality of protrusions may be UV resistant and are consistent with those materials found in livestock settings, equestrian facilities, zoos, and veterinarian enclosures. The felt-like material can be selected for its durability, ability to withstand wear and tear from the horse's teeth and hooves, and ease of cleaning and maintenance. The protrusions 112 can be attached to the base using a secure method, such as stitching, adhesive, or heat bonding, to ensure durability and longevity. In some embodiments, the protrusions can be designed to be easily replaced or repaired in case of wear or damage, allowing for the continued use of the toy. Additionally, the plurality of protrusions 112 may be arranged in layers in a circular fashion 114 about the base 104. In the preferred embodiment, as best shown in FIGS. 1-2, the reinforced areas 106 may be an area on the base 104 between the edge of the base 104 and where the circular arrangement 114 of the protrusions 112 begin.

The protrusions 112 can be arranged in a pattern or density that promotes varying levels of difficulty in foraging, thereby encouraging the horse to engage in different foraging strategies. The protrusions can have varying lengths and/or thicknesses to create a more realistic grass-like texture and challenge for the horse. In some embodiments, the base 104 may include one or more pockets or compartments for hiding treats, supplements, or other incentives to further encourage foraging behavior. These pockets or compartments can be created by folding or sewing sections of the base material, or by attaching additional pieces of material to the base.

The equine foraging toy 100 can be designed to fit within the divot of a feeding pan 108, allowing for the placement of hay pellets or other feed items in the same pan. In some embodiments, the base can be configured to fit on a flat surface, such as the bottom of a feed pan without a divot, or on the ground or floor of the horse's stall or paddock. The toy 100 can be adaptable to accommodate various types of horse feed, including but not limited to hay, hay pellets, or other suitable forage materials. In this way, the equine foraging toy can be used with a variety of feeding setups and dietary requirements, making it versatile and adaptable for use with different horses and environments.

A drawstring 116 can be attached to the base for easy removal of the toy from the feed pan or similar container. The drawstring 116 can be made of a durable material, such as nylon or polyester cord, and can be securely attached to the base using stitching, adhesive, or other suitable methods. The drawstring 116 can be designed to be easily grasped by the caretaker, allowing for quick and simple removal and cleaning of the toy as needed.

The equine foraging toy 100 can be designed to be easily and safely used by horses of various sizes, breeds, ages, and physical abilities, without causing harm or undue stress to the animal. The size and design of the toy 100 can be selected to accommodate the specific needs of the horse, taking into consideration factors such as the horse's size, weight, and mouth shape. The toy 100 can be designed to minimize the risk of injury or choking, ensuring that the horse can safely engage with the toy without the need for constant supervision.

The base 104 and/or protrusions 112 of the equine foraging toy can be made of materials that are easy to clean and maintain, allowing for regular use without significant wear or degradation. In some embodiments, the felt-like material of the protrusions can be treated with an antimicrobial agent or coating to inhibit the growth of mold, mildew, or bacteria. This can help to ensure that the toy remains hygienic and safe for use by the horse, even in damp or humid environments.

The equine foraging toy 100 can be available in various colors, patterns, or designs to provide visual stimulation and interest for the horse. The selection of colors and patterns can be chosen to enhance the overall appearance of the toy, making it more visually appealing to the horse and encouraging interaction. In some embodiments, the colors or patterns can be selected to mimic the appearance of natural grass or other forage materials, further enhancing the realism of the toy and promoting natural grazing behaviors.

In use, the equine foraging toy 100 can be placed in a feed pan or similar container, with the base configured to fit within the divot of the feeding pan or on a flat surface, as appropriate. Hay pellets, hay, or other suitable forage materials can be added to the feed pan or container, either in combination with the equine foraging toy or separately. The horse can then interact with the equine foraging toy 100, engaging in foraging behaviors by consuming its regular feed or hay through the plurality of protrusions made of a durable, felt-like material, designed to mimic grass that a horse would graze. The present invention may create the motion of chewing for long durations without a high ratio of forage or treats added to a horse's diet which is ideal for metabolic horses, and all other horses with gastric ulcers. Metabolically diagnosed horses are frequently denied pasture grazing because the fresh grass and hay can be extremely high in sugars, resulting in medical flareups and emergencies. The present invention thus has the ability to create a high rate of chewing with very little feed creating healthy increased saliva production in horses. Saliva production is known to protect the stomach from the continuous acid production in the stomach that causes stabled horses' gastric ulcers. Periodically, the equine foraging toy 100 can be removed, cleaned, and maintained as needed to ensure its continued safe and effective use.

Alternative embodiments of the present invention can include variations in the design and materials used for the equine foraging toy. For instance, the base may be constructed of an alternative material, such as a biodegradable or eco-friendly option, while still maintaining durability and functionality. In another embodiment, the protrusions could be made of a different material that simulates grass or forage more closely or provides additional sensory stimulation for the horse. The configuration of the protrusions on the base could also vary, with different patterns, densities, or arrangements to offer distinct levels of challenge and engagement for the horse. Additionally, the equine foraging toy may be adapted for use with other animals besides horses, such as cows or goats, with modifications to the size, shape, and materials to accommodate the specific needs and requirements of those animals. These alternative embodiments showcase the versatility and adaptability of the equine foraging toy, further enhancing its value as an innovative enrichment tool for animals.

In summary, the equine foraging toy of the present invention provides an innovative solution for equine enrichment that closely replicates the natural grazing experience for horses. By addressing the limitations of existing horse toys, the equine foraging toy contributes to improved welfare and well-being for horses, promoting natural grazing behaviors and providing mental and physical stimulation. The inventive toy is specifically designed to accommodate the unique needs of horses, and offers various features for ease of use, cleaning, and maintenance, making it a valuable addition to the range of available horse toys and enrichment tools.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A structure comprising:
   a base configured to be placed in a feed pan or similar container for feeding a horse;
   a plurality of protrusions attached to the base, wherein the protrusions are made of a durable, felt-like material to create a more realistic grass-like texture to mimic grass on which the horse would graze, thereby facilitating foraging behaviors in the horse while consuming its regular feed or hay;
   the plurality of protrusions arranged in a plurality of concentric circles on the base, wherein each of the plurality of protrusions arranged in each distinct one of the plurality of concentric circles have a same length and a same thickness relative to one another, and each of the plurality of protrusions arranged in some different ones of the plurality of concentric circles have a different length and/or a different thickness relative to one another; wherein
   the structure is configured as an equine foraging toy for promoting natural grazing behavior in the horse, the equine foraging toy provides both mental and physical stimulation for the horse, promoting the horse's overall health and well-being, and is specifically designed to accommodate the size, feeding habits, and dietary requirements of the horse; and
   a drawstring attached to and extending around an entirety of a periphery of the base to secure the equine foraging toy to the feed pan or similar container while in use and to permit easy removal therefrom as needed for cleaning and/or maintenance.

2. The equine foraging toy of claim 1, wherein the base is made of a durable, waterproof material suitable for use in various environments and conditions.

3. The equine foraging toy of claim 1, wherein the plurality of protrusions are arranged in a pattern or density that promotes varying levels of difficulty in foraging, thereby encouraging the horse to engage in different foraging strategies.

4. The equine foraging toy of claim 1, wherein the base is configured to fit within a divot of the feed pan or similar container, allowing for the placement of hay pellets or other feed items in the same pan.

5. The equine foraging toy of claim 1, wherein the felt-like material of the protrusions is selected from a group consisting of polyester, acrylic, wool, or a blend thereof.

6. The equine foraging toy of claim 2, wherein the base includes a non-slip material or feature to prevent the toy from moving excessively within the feed pan or similar container during use.

7. The equine foraging toy of claim 2, wherein the base is shaped as a circle, oval, square, rectangle, or any other suitable shape to accommodate various feed pan sizes and shapes.

8. The equine foraging toy of claim 1, wherein the toy is adaptable to accommodate various types of horse feed, including but not limited to hay, hay pellets, or other suitable forage materials.

9. The equine foraging toy of claim 1, wherein the base and/or protrusions are made of materials that are easy to clean and maintain, allowing for regular use without significant wear or degradation.

10. The equine foraging toy of claim 1, wherein the drawstring is made of a durable material, such as nylon or polyester cord, and is securely attached to the base.

11. The equine foraging toy of claim 1, wherein the protrusions are attached to the base using a secure method, such as stitching, adhesive, or heat bonding, to ensure durability and longevity.

12. The equine foraging toy of claim 1, wherein the base comprises one or more reinforced areas to provide additional structural support and prevent damage from the horse's teeth or hooves during use.

13. The equine foraging toy of claim 5, wherein the felt-like material of the protrusions is treated with an anti-microbial agent or coating to inhibit the growth of mold, mildew, or bacteria.

14. The equine foraging toy of claim 1, wherein the toy includes one or more attachment points, loops, or straps for securing the toy to the feed pan or similar container, or for hanging the toy in the horse's stall or paddock.

15. The equine foraging toy of claim 1, wherein the base and/or protrusions are available in various colors, patterns, or designs to provide visual stimulation and interest for the horse.

16. The equine foraging toy of claim 1, wherein the base includes one or more pockets or compartments for hiding treats, supplements, or other incentives to further encourage foraging behavior.

17. A structure comprising:

a base configured to be placed in a feed pan or similar container for feeding a horse, wherein the base is made of a durable, waterproof material suitable for use in various environments and conditions;

a plurality of protrusions attached to the base, wherein the protrusions are made of a durable, felt-like material selected from a group consisting of polyester, acrylic, wool, or a blend thereof to create a more realistic grass-like texture to mimic grass on which the horse would graze, thereby facilitating foraging behaviors in the horse while consuming its regular feed or hay;

the plurality of protrusions arranged in a plurality of concentric circles on the base, wherein each of the plurality of protrusions arranged in each distinct one of the plurality of concentric circles have a same length and a same thickness relative to one another, and each of the plurality of protrusions arranged in some different ones of the plurality of concentric circles have a different length and/or a different thickness relative to one another; wherein the structure is configured as an equine foraging toy for promoting natural grazing behavior in the horse, the equine foraging toy provides both mental and physical stimulation for horses, promoting the horse's overall health and well-being, and is specifically configured to accommodate the size, feeding habits, and dietary requirements of the horse; and a drawstring attached to and extending around an entirety of a periphery of the base to secure the equine foraging toy to the feed pan or similar container while in use and to permit easy removal therefrom as needed for cleaning and/or maintenance.

18. A structure comprising:

a base configured to be placed in a feed pan or similar container, wherein the base is made of a durable, waterproof material suitable for use in various environments and conditions, and includes a non-slip material or feature to prevent the structure from moving excessively within the feed pan or similar container during use;

a plurality of protrusions attached to the base, wherein the protrusions are made of a durable, felt-like material selected from a group consisting of polyester, acrylic, wool, or a blend thereof to create a more realistic grass-like texture to mimic grass that a horse would graze, thereby facilitating foraging behaviors in the horse while consuming its regular feed or hay;

the plurality of protrusions arranged in a plurality of concentric circles on the base, wherein each of the plurality of protrusions arranged in each distinct one of the plurality of concentric circles have a same length and a same thickness relative to one another, and each of the plurality of protrusions arranged in some different ones of the plurality of concentric circles have a different length and/or a different thickness relative to one another;

the base configured to fit within a divot of the feed pan or similar container, allowing for the placement of hay pellets or other feed items in the same pan; wherein the structure is configured as an equine foraging toy for promoting natural grazing behavior in the horse, the equine foraging toy provides both mental and physical stimulation for horses, promoting the horse's overall health and well-being, and is specifically designed to accommodate the size, feeding habits, and dietary requirements of the horse; and a drawstring attached to and extending around an entirety of a periphery of the base to secure the equine foraging toy to the feed pan or similar container while in use and to permit easy removal therefrom as needed for cleaning and/or maintenance.

\* \* \* \* \*